United States Patent
Lim (10) Patent No.: US 12,555,842 B2
(45) Date of Patent: Feb. 17, 2026

(54) BATTERY TEMPERATURE CONTROL APPARATUS, BATTERY SYSTEM, ENERGY STORAGE SYSTEM AND BATTERY TEMPERATURE CONTROL METHOD

(71) Applicant: LG Energy Solution, Ltd., Seoul (KR)

(72) Inventor: Bo-Mi Lim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 616 days.

(21) Appl. No.: 17/631,215

(22) PCT Filed: Jul. 10, 2020

(86) PCT No.: PCT/KR2020/009143
§ 371 (c)(1),
(2) Date: Jan. 28, 2022

(87) PCT Pub. No.: WO2021/020764
PCT Pub. Date: Feb. 4, 2021

(65) Prior Publication Data
US 2022/0271361 A1  Aug. 25, 2022

(30) Foreign Application Priority Data

Aug. 1, 2019 (KR) .......................... 10-2019-0093948
Jul. 8, 2020 (KR) .......................... 10-2020-0084321

(51) Int. Cl.
*H01M 10/63* (2014.01)
*H01M 10/48* (2006.01)
(Continued)

(52) U.S. Cl.
CPC ........... *H01M 10/63* (2015.04); *H01M 10/48* (2013.01); *H01M 10/486* (2013.01);
(Continued)

(58) Field of Classification Search
CPC ............... H01M 10/63; H01M 10/613; H01M 10/6563; H01M 10/486; H01M 10/633;
(Continued)

(56) References Cited

U.S. PATENT DOCUMENTS

2003/0087148 A1   5/2003  Minamiura
2005/0269994 A1  12/2005  Ishishita
(Continued)

FOREIGN PATENT DOCUMENTS

CN   104577254 A  *  4/2015  ............. Y02E 60/10
CN   205621815 U  * 10/2016  ............. Y02E 60/10
(Continued)

OTHER PUBLICATIONS

Extended European Search Report dated Jul. 28, 2022 issued by the European Patent Office in a corresponding European Patent Application No. 20847442.9.
(Continued)

*Primary Examiner* — Kaity V Chandler
(74) *Attorney, Agent, or Firm* — Morgan, Lewis & Bockius LLP (57) ABSTRACT

Provided are a battery temperature control apparatus, a battery temperature control method and a battery system. The battery temperature control apparatus includes first to $n^{th}$ cooling fans provided in a one-to-one relationship to first to $n^{th}$ battery modules connected in series, first to $n^{th}$ slave management units provided to the first to $n^{th}$ battery modules in a one-to-one relationship, and a master management unit. n is a natural number of 2 or greater. The master management unit determines battery temperature information including first to $n^{th}$ temperature values and a first reference value. The first to $n^{th}$ temperature values indicate temperatures of the first to $n^{th}$ battery modules. The first reference value is an average or a median of the first to $n^{th}$ temperature
(Continued)

values. The master management unit controls a rotation speed of each cooling fan based on the battery temperature information.

9 Claims, 8 Drawing Sheets

(51) Int. Cl.
    *H01M 10/613*     (2014.01)
    *H01M 10/633*     (2014.01)
    *H01M 10/6563*     (2014.01)

(52) U.S. Cl.
    CPC ....... *H01M 10/613* (2015.04); *H01M 10/633* (2015.04); *H01M 10/6563* (2015.04)

(58) Field of Classification Search
    CPC ... H01M 10/48; G01R 31/392; G01R 31/387; Y02E 60/10
    See application file for complete search history.

(56) References Cited

U.S. PATENT DOCUMENTS

| | | | |
|---|---|---|---|
| 2012/0032638 A1 | 2/2012 | Jung | |
| 2013/0149583 A1 | 6/2013 | Kurita | |
| 2014/0217958 A1* | 8/2014 | Verdun | H02J 7/0071 320/134 |
| 2017/0365893 A1 | 12/2017 | Kim et al. | |
| 2018/0083460 A1 | 3/2018 | Min | |
| 2019/0389452 A1* | 12/2019 | Duan | B60W 10/30 |
| 2021/0178928 A1 | 6/2021 | Ruppert et al. | |

FOREIGN PATENT DOCUMENTS

| | | | | |
|---|---|---|---|---|
| CN | 110085943 A | * | 8/2019 | .......... H01M 10/615 |
| CN | 110661059 A | * | 1/2020 | .......... H01M 10/633 |
| CN | 111164441 A | * | 5/2020 | ........ H01M 10/4257 |
| JP | H10341505 A | * | 12/1998 | ............. Y02E 60/10 |
| JP | 3052936 B2 | | 6/2000 | |
| JP | 2003-142167 A | | 5/2003 | |
| JP | 2005-183241 A | | 7/2005 | |
| JP | 2005-310596 A | | 11/2005 | |
| JP | 2005-347085 A | | 12/2005 | |
| JP | 2011-109910 A | | 6/2011 | |
| JP | 2015-056354 A | | 3/2015 | |
| JP | 2019-126206 A | | 7/2019 | |
| KR | 101000550 B1 | * | 4/2010 | .......... H01M 10/486 |
| KR | 10-2012-0091260 A | | 8/2012 | |
| KR | 10-2013-0051102 A | | 5/2013 | |
| KR | 10-2015-0044162 A | | 4/2015 | |
| KR | 10-1570475 B1 | | 11/2015 | |
| KR | 10-2017-0142053 A | | 12/2017 | |
| KR | 10-2018-0032084 A | | 3/2018 | |
| KR | 10-2018-0108800 A | | 10/2018 | |

OTHER PUBLICATIONS

Office Action dated Mar. 6, 2023, issued in corresponding Japanese Patent Application No. 2022-506498.

International Search Report issued in corresponding International Patent Application No. PCT/KR2020/009143 dated Oct. 29, 2020.

* cited by examiner

BATTERY TEMPERATURE CONTROL APPARATUS, BATTERY SYSTEM, ENERGY STORAGE SYSTEM AND BATTERY TEMPERATURE CONTROL METHOD

TECHNICAL FIELD

The present disclosure relates to technology that controls the temperature of a battery.

The present disclosure claims the benefit of Korean Patent Application No. 10-2019-0093948 filed on Aug. 1, 2019 and Korean Patent Application No. 10-2020-0084321 filed on Jul. 8, 2020, the disclosure of which is incorporated herein by reference in its entirety.

BACKGROUND ART

Recently, there has been dramatically growing demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

The battery system may be provided to store power supplied from the outside and then supply the stored power to the outside in an emergency. The battery system basically includes battery modules and a controller for controlling each battery module.

There may be a temperature difference between the battery modules due to the internal and external environments of the battery system or repeated charging/discharging. The temperature of the battery module greatly affects the performance (for example, charge and discharge efficiency) of the battery module, so cooling is necessary to make sure that the temperature of the battery module is within an appropriate range.

The inventor found some distinct correlations through experiments carried out on battery modules in the same battery group. First, the temperature of each battery module is affected by the temperature of other battery modules. Second, as the battery modules are exposed to high temperature environment for a longer term and they are at higher state of charge (SOC), their state of health (SOH) decreases more sharply.

However, it is general to cool each battery module based solely on the temperature of the corresponding battery module. That is, in the cooling control for each battery module, the temperature of other battery modules is not taken into account. In addition, SOH and SOC of each battery module are not considered in the temperature control. When cooling each battery module based solely on the temperature of the corresponding battery module, it fails to reduce a temperature difference between battery modules in the same battery group, causing non-uniform degradation of the battery modules.

DISCLOSURE

Technical Problem

The present disclosure is directed to providing an apparatus and method for controlling a cooling level (for example, an amount of cooling medium) for each battery module based on the temperature of at least two of battery modules belonging to the same battery group.

The present disclosure is further directed to providing an apparatus and method for performing individual cooling for each battery module further based on the state of charge and/or the state of health of each battery module belonging to the same battery group.

The present disclosure is further directed to providing an apparatus and method for supplying power required for cooling of each battery module to not only the corresponding battery modules but also the remaining battery modules.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A battery temperature control apparatus according to an aspect of the present disclosure is for a battery group including first to $n^{th}$ battery modules connected in series. n is a natural number of 2 or greater. The battery temperature control apparatus includes first to $n^{th}$ cooling fans provided to the first to $n^{th}$ battery modules in a one-to-one relationship, first to $n^{th}$ slave management units provided to the first to $n^{th}$ battery modules in a one-to-one relationship, and a master management unit operably coupled to the first to $n^{th}$ cooling fans and the first to $n^{th}$ slave management units. The master management unit is configured to determine battery temperature information including first to $n^{th}$ temperature values and a first reference value based on a notification signal from each of the first to $n^{th}$ slave management units. The first to $n^{th}$ temperature values indicate temperatures of the first to $n^{th}$ battery modules. The first reference value is an average or a median of the first to $n^{th}$ temperature values. The master management unit is configured to control a rotation speed of each of the first to $n^{th}$ cooling fans based on the battery temperature information.

Where i=1 to n, when the $i^{th}$ temperature value is equal to or less than the first reference value, the master management unit may be configured to determine the rotation speed of the $i^{th}$ cooling fan using the following Equation 1. Where i=1 to n, when the $i^{th}$ temperature value is greater than the first reference value, the master management unit may be configured to determine the rotation speed of the $i^{th}$ cooling fan using the following Equation 2.

$$F_i = (T_i - T_L) \times K_1 \qquad \text{[Equation 1]}$$

$$F_i = \{(T_i - T_L) \times K_1\} + \{(T_i - T_{ref}) \times K_2\} \qquad \text{[Equation 2]}$$

In the Equations 1 and 2, $T_i$ is the $i^{th}$ temperature value, $T_L$ is a threshold temperature value, $T_{ref}$ is the first reference value, $K_1$ is a first weight, $K_2$ is a second weight, and $F_i$ is the rotation speed of the $i^{th}$ cooling fan.

The master management unit may be configured to determine battery life information including first to $n^{th}$ states of health (SOHs) and a second reference value based on the notification signal. The first to $n^{th}$ SOHs indicate a remaining life of the first to $n^{th}$ battery modules. The second reference value is an average or a median of the first to $n^{th}$ SOHs. The master management unit may be configured to determine the rotation speed of each of the first to $n^{th}$ cooling fans further based on the battery life information.

Where i=1 to n, when the $i^{th}$ temperature value is equal to or less than the first reference value, the master management unit may be configured to determine the rotation speed of the $i^{th}$ cooling fan using the following Equation 3. Where i=1 to n, when the $i^{th}$ temperature value is greater than the first reference value, the master management unit may be configured to determine the rotation speed of the $i^{th}$ cooling fan using the following Equation 4.

$$F_i = \{(T_i - T_L) \times K_3\} + \{(SOH_{ref} - SOH_i) \times K_5\} \quad \text{[Equation 3]}$$

$$F_i = \{(T_i - T_L) \times K_3\} + \{(T_i - T_{ref}) \times K_4\} + \{(SOH_{ref} - SOH_i) \times K_5\} \quad \text{[Equation 4]}$$

In Equations 3 and 4, $T_i$ is the $i^{th}$ temperature value, $T_L$ is a threshold temperature value, $T_{ref}$ is the first reference value, $SOH_i$ is the $i^{th}$ SOH, $SOH_{ref}$ is the second reference value, $K_3$ is a third weight, $K_4$ is a fourth weight, $K_5$ is a fifth weight, and $F_i$ is the rotation speed of the $i^{th}$ cooling fan.

The master management unit may be configured to determine battery capacity information including first to $n^{th}$ states of charge (SOCs) and a third reference value based on the notification signal. The first to $n^{th}$ SOCs indicate a remaining capacity of the first to $n^{th}$ battery modules. The third reference value is an average or a median of the first to $n^{th}$ SOCs. The master management unit may be configured to determine the rotation speed of each of the first to $n^{th}$ cooling fans further based on the battery capacity information.

Where i=1 to n, when the $i^{th}$ temperature value is equal to or less than the first reference value, the master management unit may be configured to determine the rotation speed of the $i^{th}$ cooling fan using the following Equation 5. Where i=1 to n, when the $i^{th}$ temperature value is greater than the first reference value, the master management unit may be configured to determine the rotation speed of the $i^{th}$ cooling fan using the following Equation 6.

$$F_i = \{(T_i - T_L) \times K_6\} + \{(SOH_{ref} - SOH_i) \times K_8\} + \{(SOC_i - SOC_{ref}) \times K_9\} \quad \text{[Equation 5]}$$

$$F_i = \{(T_i - T_L) \times K_6\} + \{(T_i - T_{ref}) \times K_7\} + \{(SOH_{ref} - SOH_i) \times K_8\} + \{(SOC_i - SOC_{ref}) \times K_9\} \quad \text{[Equation 6]}$$

In the Equations 5 and 6, $T_i$ is the $i^{th}$ temperature value, $T_{ref}$ is the first reference value, $T_L$ is a threshold temperature value, $SOH_i$ is the $i^{th}$ SOH, $SOH_{ref}$ is the second reference value, $SOC_i$ is the $i^{th}$ SOC, $SOC_{ref}$ is the third reference value, $K_6$ is a sixth weight, $K_7$ is a seventh weight, $K_8$ is an eighth weight, $K_9$ is a ninth weight, and $F_i$ is the rotation speed of the $i^{th}$ cooling fan.

The battery temperature control apparatus may further include a power supply circuit. The power supply circuit includes a main series circuit connected in parallel to the battery group, and first to $n^{th}$ sub-series circuits connected in parallel to the first to $n^{th}$ cooling fans in a one-to-one relationship. The main series circuit includes a main coil and a main switch connected in series to each other. Each sub-series circuit includes a sub-coil and a sub-switch connected in series to each other. The master management unit may be configured to control the main switch and each sub-switch based on the rotation speed of each of the first to $n^{th}$ cooling fans.

A battery system according to another aspect of the present disclosure includes the battery temperature control apparatus.

An energy storage system according to still another aspect of the present disclosure includes the battery system.

A battery temperature control method according to yet another aspect of the present disclosure is for a battery group including first to $n^{th}$ battery modules connected in series. n is a natural number of 2 or greater. The battery temperature control method includes determining battery temperature information including first to $n^{th}$ temperature values and a first reference value. The first to $n^{th}$ temperature values indicate temperatures of the first to $n^{th}$ battery modules. The first reference value is an average or a median of the first to $n^{th}$ temperature values. The battery temperature control method further includes controlling a rotation speed of each of the first to $n^{th}$ cooling fans based on the battery temperature information.

The battery temperature control method may further include determining battery life information including first to $n^{th}$ SOHs and a second reference value. The first to $n^{th}$ SOHs indicate a remaining life of the first to $n^{th}$ battery modules. The second reference value is an average or a median of the first to $n^{th}$ SOHs. The rotation speed of each of the first to $n^{th}$ cooling fans may be determined further based on the battery life information.

The battery temperature control method may further include determining battery capacity information including first to $n^{th}$ SOCs and a third reference value. The first to $n^{th}$ SOCs indicate a remaining capacity of the first to $n^{th}$ battery modules. The third reference value is an average or a median of the first to $n^{th}$ SOCs. The rotation speed of each of the first to $n^{th}$ cooling fans may be determined further based on the battery capacity information.

Advantageous Effects

According to at least one of the embodiments of the present disclosure, the cooling level for each battery module is controlled based on the temperature of at least two of battery modules belonging to the same battery group, thereby effectively reducing a temperature difference between the battery modules.

In addition, according to at least one of the embodiments of the present disclosure, individual cooling is performed on each battery module further based on the state of charge and/or the state of health of each battery module belonging to the same battery group, thereby effectively reducing a life difference between the battery modules.

Further, according to at least one of the embodiments of the present disclosure, power required for cooling for each battery module is supplied to not only the corresponding battery module but also the other battery modules, thereby suppressing deviation in life difference between the battery modules more effectively.

The effects of the present disclosure are not limited to the effects mentioned above, and these and other effects will be clearly understood by those skilled in the art from the appended claims.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

The terms including the ordinal number such as "first", "second" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements. Additionally, the term "control unit" as used herein refers to a processing unit of at least one function or operation, and this may be implemented by either hardware or software or a combination of hardware and software.

In addition, throughout the specification, it will be further understood that when an element is referred to as being "connected to" another element, it can be directly connected to the other element or intervening elements may be present. Additionally, the term "management unit" as used herein refers to a processing unit of at least one function or operation, and this may be implemented by either hardware or software or a combination of hardware and software.

In the specification, n as used herein is a natural number of 2 or greater, and i as used herein is 1 to n, i.e., a natural number of n or smaller.

Figure 1:
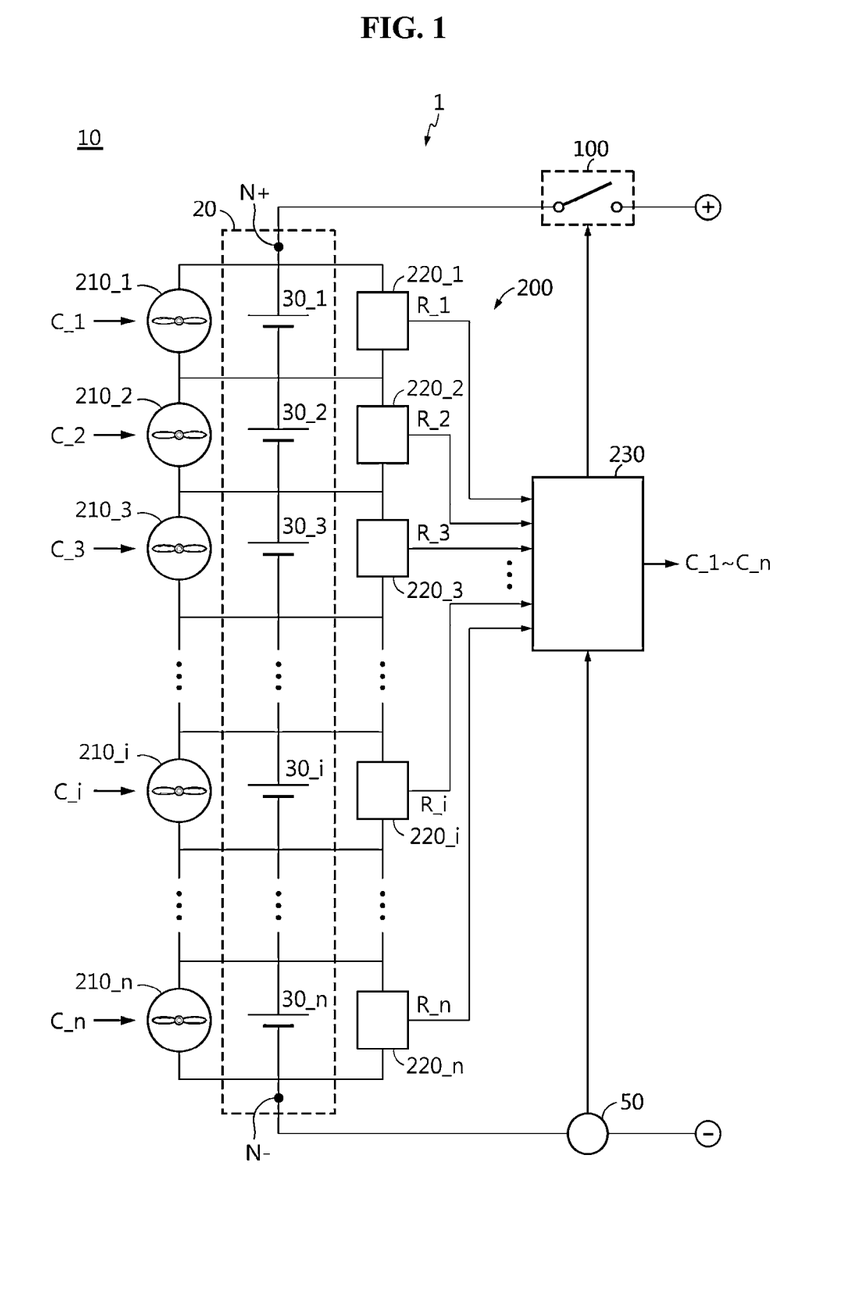
FIG. 1 is a diagram exemplarily showing a configuration of a battery system according to a first embodiment of the present disclosure.
Figure 2:
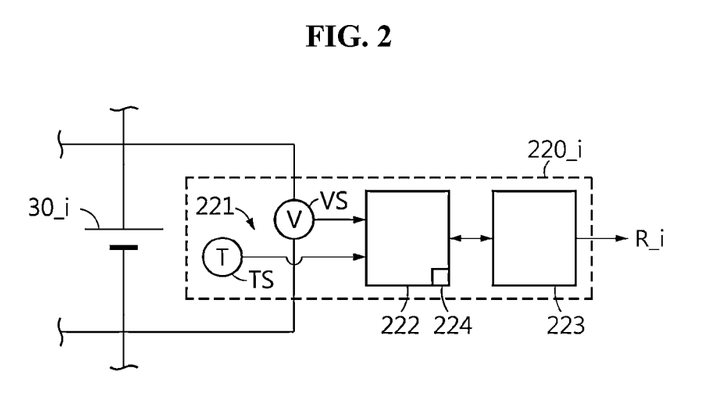
FIG. 2 is a diagram exemplarily showing a configuration of a slave of FIG. 1.
Figure 3:
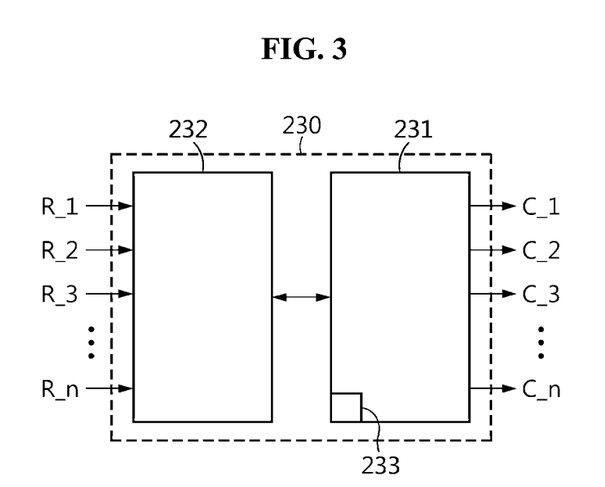
FIG. 3 is a diagram exemplarily showing a configuration of a master of FIG. 1.

FIG. 1 is a diagram exemplarily showing the configuration of a battery system 10 according to a first embodiment of the present disclosure, FIG. 2 is a diagram exemplarily showing a configuration of a slave 220_$i$ of FIG. 1, and FIG. 3 is a diagram exemplarily showing a configuration of a master 230 of FIG. 1.

The battery system 10 may be included in an energy storage system 1. The energy storage system 1 may further include a power conversion system (PCS) (not shown). The PCS may convert DC power from the battery system 10 into AC power and supply it to an electrical grid. Referring to FIGS. 1 to 3, the battery system 10 includes a battery group 20, a current sensor 50, a relay 100 and a battery temperature control apparatus 200 (hereinafter referred to as "apparatus").

The battery group 20 includes a first node N+, a second node N− and first to $n^{th}$ battery modules 30_1 to 30_$n$.

The first to $n^{th}$ battery modules 30_1 to 30_$n$ are electrically connected in series between the first node N+ and the second node N−. The battery module 30_$i$ includes at least one battery cell. The battery cell is not limited to a particular type, and may include any type that can be repeatedly charged and discharged, for example, a lithium ion cell.

The current sensor 50 is electrically connected in series to the battery group 20 through a current path for charging and discharging the battery group 20. The current sensor 50 is configured to detect a current flowing through the current path and output a current signal indicating the detected current to the master 230.

The relay 100 is installed on the current path for charging and discharging the battery group 20. That is, the battery group 20, the current sensor 50 and the relay 100 are connected in series through the current path. A control terminal of the relay 100 is electrically connected to the apparatus 200. The relay 100 is on-off controlled in response to a switching signal from the apparatus 200 outputted to the control terminal.

The apparatus 200 is provided to individually control the temperatures of the first to $n^{th}$ battery modules 30_1 to 30_$n$ using first to $n^{th}$ cooling fans 210_1 to 210_$n$ to prevent the overheat of the first to $n^{th}$ battery modules 30_1 to 30_$n$ and non-uniform degradation of the first to $n^{th}$ battery modules 30_1 to 30_$n$.

The apparatus 200 includes the first to $n^{th}$ cooling fans 210_1 to 210_$n$, first to $n^{th}$ slave management units 220_1 to 220_$n$ and a master management unit 230. The current sensor 50 may be included in the apparatus 200. Hereinafter, the slave management unit will be referred to as a 'slave', and the master management unit will be referred to as a 'master'.

The first to $n^{th}$ cooling fans 210_1 to 210_$n$ are provided to the first to $n^{th}$ battery modules 30_1 to 30_$n$ in a one-to-one relationship. When i=1 to n, the cooling fan 210_$i$ is for cooling the battery module 30_$i$. That is, while the cooling fan 210_$i$ rotates, the battery module 30_$i$ is cooled by a cooling medium (for example, air) delivered from the cooling fan 210_$i$. With the increasing rotation speed of the cooling fan 210_$i$, the battery module 30_$i$ will be cooled faster. In response to a control signal C_$i$ from the slave 220_$i$ or the master 230, the cooling fan 210_$i$ is configured to rotate at a rotation speed required by the control signal C_$i$. The cooling fan 210_$i$ may be electrically connected to positive and negative terminals of the battery module 30_$i$ through a pair of power supply lines. Accordingly, when the control signal C_$i$ is applied to the cooling fan 210_$i$, the cooling fan 210_$i$ may operate using power supplied from the battery module 30_$i$.

The first to $n^{th}$ slaves 220_1 to 220_$n$ are provided to the first to $n^{th}$ battery modules 30_1 to 30_$n$ in a one-to-one relationship. The slave 220_$i$ is coupled to the battery module 30_$i$ to monitor the state of the battery module 30_$i$. The parameter indicating the state of the battery module 30_$i$, for example, at least one of the voltage, the current or the temperature of the battery module 30_$i$, is detected by the slave 220_$i$ periodically or aperiodically.

The slave 220_i includes a sensing circuit 221, a control circuit 222 and a communication circuit 223.

The sensing circuit 221 includes a temperature sensor TS. The sensing circuit 221 may further include a voltage sensor VS. The temperature sensor TS is configured to detect the temperature of the battery module 30_i and output a signal indicating the detected temperature to the control circuit 222. The voltage sensor VS is electrically connected to the positive and negative terminals of the battery module 30_i. The voltage sensor VS is configured to detect the voltage across the battery module 30_i and output a signal indicating the detected voltage to the control circuit 222.

The control circuit 222 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors or electrical units for performing other functions. The control circuit 222 may include a memory 224. The memory 224 may store programs and data necessary to perform the steps described below. The memory 224 may include, for example, at least one type of storage medium of flash memory type, hard disk type, solid state disk (SSD) type, silicon disk drive (SDD) type, multimedia card micro type, random access memory (RAM), static random access memory (SRAM), read-only memory (ROM), electrically erasable programmable read-only memory (EEPROM) or programmable read-only memory (PROM).

The control circuit 222 generates a notification signal R_i indicating the state of the battery module 30_i based on the signals from the sensing circuit 221.

The communication circuit 223 is provided for communication with the master 230. The communication circuit 223 transmits the notification signal R_i from the control circuit 222 to the master 230. The communication circuit 223 may transmit commands (for example, wake-up, sleep, shut-down, battery cooling) from the master 230 to the control circuit 222. The communication circuit 223 may provide a wired network such as a local area network (LAN), a controller area network (CAN) and a daisy chain and/or a wireless network such as Bluetooth, ZigBee and Wi-Fi.

The master 230 is operably coupled to the current sensor 50, the relay 100, the first to $n^{th}$ cooling fans 210_1 to 210_n, and the first to $n^{th}$ slaves 220_1 to 220_n. The master 230 includes a control circuit 231 and a communication circuit 232.

The control circuit 231 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors or electrical units for performing other functions. The control circuit 231 may include a memory 233. The memory 233 may store programs and data necessary to perform the steps described below. The memory 233 may include, for example, at least one type of storage medium of a flash memory type, hard disk type, solid state disk (SSD) type, silicon disk drive (SDD) type, multimedia card micro type, random access memory (RAM), static random access memory (SRAM), read-only memory (ROM), electrically erasable programmable read-only memory (EEPROM) or programmable read-only memory (PROM).

The communication circuit 232 is provided for communication with the first to $n^{th}$ slaves 220_1 to 220_n. The communication circuit 232 transmits information of notification signals R_1 to R_n from the first to $n^{th}$ slaves 220_1 to 220_n to the control circuit 231. The communication circuit 232 transmits commands from the control circuit 231 to the first to $n^{th}$ slaves 220_1 to 220_n. The communication circuit 232 may provide a wired network such as a local area network (LAN), a controller area network (CAN) and a daisy chain and/or a wireless network such as Bluetooth, ZigBee and Wi-Fi.

The control circuit 231 determines battery temperature information based on the notification signals R_1 to R_n from the first to $n^{th}$ slaves 220_1 to 220_n. The control circuit 231 may further determine battery life information and/or battery capacity information based on the current signal from the current sensor 50 and the notification signals R_1 to R_n from the first to $n^{th}$ slaves 220_1 to 220_n.

The battery temperature information includes first to $n^{th}$ temperature values and a first reference value. The $i^{th}$ temperature value indicates the temperature of the $i^{th}$ battery module 30_i. The first reference value indicates a representative value (for example, an average, a median) of the first to $n^{th}$ temperature values.

The battery life information includes first to $n^{th}$ states of health (SOHs) and a second reference value. The SOH indicates the remaining life of the $i^{th}$ battery module 30_i. The second reference value indicates a representative value (for example, an average, a median) of the first to $n^{th}$ SOHs. The $i^{th}$ SOH may be determined from the following Equation.

$$SOH_i = \frac{\int_{t_1}^{t_2} i(t)dt}{SOC(t_2) - SOC(t_1)} \times 100\,(\%)$$

In the above Equation, $Q_{ref}$ denotes a predetermined reference capacity, $SOC(t_1)$ denotes the state of charge (SOC) of the $i^{th}$ battery module 30_i at the time point t1, $SOC(t_2)$ denotes the $i^{th}$ battery module 30_i at the time point t2 later than the time point t1, i(t) denotes the current detected at the time point t between the time point t1 and the time point t2, and $SOH_i$ denotes the $i^{th}$ SOH. $Q_{ref}$ may be stored in the memory 233, and indicates the maximum capacity of the battery module 30_i when the battery module 30_i is fresh at Beginning Of Life (BOL). The time point $t_2$ may be the latest time point at which the absolute value of difference between the $SOC(t_1)$ and the $SOC(t_2)$ is equal to or greater than a threshold (for example, 0.5).

The battery capacity information includes first to $n^{th}$ SOCs and a third reference value. The $i^{th}$ SOC indicates the remaining capacity of the $i^{th}$ battery module 30_i. The third reference value indicates a representative value (for example, an average, a median) of the first to $n^{th}$ SOCs. The $i^{th}$ SOC may be determined from a variety of known SOC estimation algorithms. For example, the $i^{th}$ SOC may be determined from a predetermined open-circuit-voltage (OCV)-SOC curve by using OCV of the $i^{th}$ battery module 30_i as an index. As another example, the $i^{th}$ SOC may be determined based on a cumulative current value of the $i^{th}$ battery module 30_i over time using ampere counting. As another example, the $i^{th}$ SOC may be determined from a voltage history, a current history and a temperature history of the battery module 30_i using a Kalman filter.

The control circuit 231 generates the switching signal for controlling the on-off state of the relay 100 based on at least one of battery temperature information, the battery life information or the battery capacity information.

The control circuit 231 generates first to $n^{th}$ control signals C_1 to C_n for controlling the rotation speed of the first to $n^{th}$ cooling fans 210_1~210_n based on at least one of the battery temperature information, the battery life information or the battery capacity information.

Figure 4:
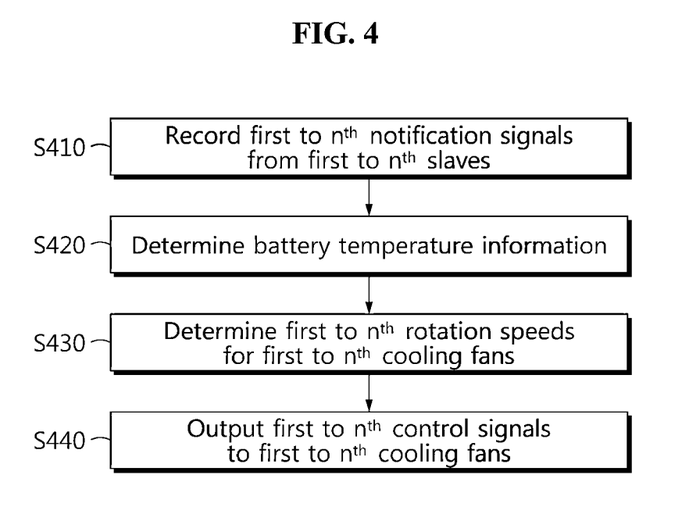
FIG. 4 is a flowchart exemplarily showing a method for controlling the temperature of a battery group.

FIG. 4 is a flowchart exemplarily showing one method for controlling the temperature of the battery group 20 of FIG. 1.

Referring to FIGS. 1 to 4, in step S410, the master 230 records the first to $n^{th}$ notification signals R_1 to R_n from the first to $n^{th}$ slaves 220_1 to 220_n in the memory 233 of the master 230. The first to $n^{th}$ notification signals R_1 to R_n may indicate the states of the first to $n^{th}$ battery modules 30_1 to 30_n at the same time point. That is, the $i^{th}$ notification signal R_i is transmitted by the $i^{th}$ slave 220_i, and indicates the state of the $i^{th}$ battery module 30_i.

In step S420, the master 230 determines battery temperature information based on the first to $n^{th}$ notification signals R_1 to R_n. The battery temperature information includes first to $n^{th}$ temperature values and the first reference value.

In step S430, the master 230 determines the first to $n^{th}$ rotation speeds for the first to $n^{th}$ cooling fans 210_1 to 210_n based on the battery temperature information.

For example, when the $i^{th}$ temperature value is equal to or less than the first reference value, the control circuit 231 may determine the $i^{th}$ rotation speed associated with the $i^{th}$ cooling fan 210_i using the following Equation 1. When the $i^{th}$ temperature value is greater than the first reference value, the control circuit 231 may determine the $i^{th}$ rotation speed associated with the $i^{th}$ cooling fan 210_i using the following Equation 2.

$$F_i = (T_i - T_L) \times K_1 \quad \text{[Equation 1]}$$

$$F_i = \{(T_i - T_L) \times K_1\} + \{(T_i - T_{ref}) \times K_2\} \quad \text{[Equation 2]}$$

In Equations 1 and 2, $T_i$ is the $i^{th}$ temperature value, $T_L$ is the threshold temperature value, $T_{ref}$ is the first reference value, $K_1$ is the first weight, $K_2$ is the second weight, and $F_i$ is the $i^{th}$ rotation speed associated with the $i^{th}$ cooling fan 210_i. The threshold temperature value $T_L$ indicates a predetermined lower limit temperature (for example, 5° C.) to prevent overcooling.

Each of $K_1$ and $K_2$ may be a preset positive number. Alternatively, $K_1$ and $K_2$ may be obtained from a first data table and a second data table, respectively, using the first reference value of the battery temperature information as an index. The first data table defines a correspondence between $T_{ref}$ and $K_1$. In the first data table, a larger $T_{ref}$ is associated with a larger $K_1$. The second data table defines a correspondence between $T_{ref}$ and $K_2$. In the second data table, a larger $T_{ref}$ is associated with a larger $K_2$. Alternatively, the control circuit 231 may set $K_2$ to be equal to $K_1$ from the first data table, instead of using the second data table.

As another example, when the $i^{th}$ temperature value is equal to or less than the first reference value, the control circuit 231 may set the rotation speed associated with the $i^{th}$ cooling fan 210_i to a first value, and otherwise, set the rotation speed associated with the $i^{th}$ cooling fan 210_i to a second value. The second value (for example, 10 rotations/sec) is greater than the first value (for example, 7 rotations/sec).

In step S440, the master 230 outputs the first to $n^{th}$ control signals C_1 to C_n to the first to $n^{th}$ cooling fans 210_1 to 210_n. That is, the $i^{th}$ control signal C_i is output to the $i^{th}$ cooling fan 210_i. The $i^{th}$ control signal C_i is a signal for commanding the $i^{th}$ cooling fan 210_i to rotate at the $i^{th}$ rotation speed.

Figure 5:
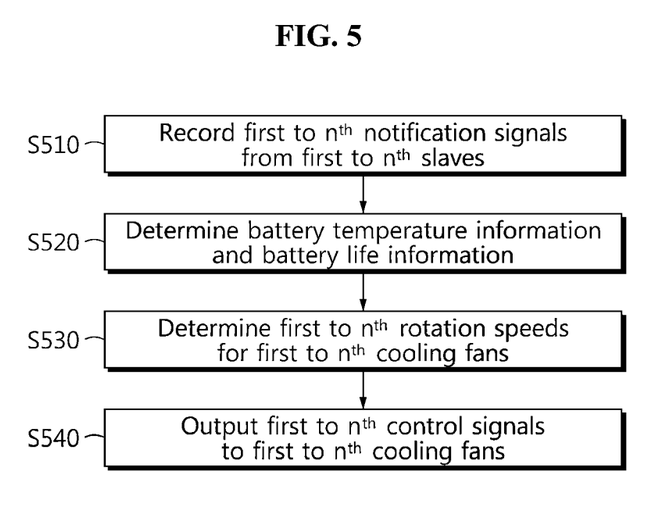
FIG. 5 is a flowchart exemplarily showing another method for controlling the temperature of a battery group.

FIG. 5 is a flowchart exemplarily showing another method for controlling the temperature of the battery group 20 of FIG. 1.

Referring to FIGS. 1 to 3 and 5, in step S510, the master 230 records the first to $n^{th}$ notification signals R_1 to R_n from the first to $n^{th}$ slaves 220_1 to 220_n. 230 in the memory 233 of the master 230. The first to $n^{th}$ notification signals R_1 to R_n may indicate the states of the first to $n^{th}$ battery modules 30_1 to 30_n at the same time point. That is, the $i^{th}$ notification signal R_i is transmitted by the $i^{th}$ slave 220_i, and indicates the state of the $i^{th}$ battery module 30_i.

In step S520, the master 230 determines battery temperature information and battery life information based on the first to $n^{th}$ notification signals R_1 to R_n. The battery temperature information includes first to $n^{th}$ temperature values and a first reference value. The battery life information includes first to $n^{th}$ SOHs and a second reference value.

In step S530, the master 230 determines first to $n^{th}$ rotation speeds for the first to $n^{th}$ cooling fans 210_1 to 210_n based on the battery temperature information and the battery life information.

For example, when the $i^{th}$ temperature value is equal to or less than the first reference value and the $i^{th}$ SOH is equal to or greater than the second reference value, the control circuit 231 may determine the $i^{th}$ rotation speed associated with the $i^{th}$ cooling fan 210_i using the above Equation 1. When the $i^{th}$ temperature value is equal to or greater than the first reference value and the $i^{th}$ SOH is equal to or greater than the second reference value, the control circuit 231 may determine the $i^{th}$ rotation speed associated with the $i^{th}$ cooling fan 210_i using the above Equation 2.

As another example, when the $i^{th}$ temperature value is equal to or less than the first reference value and the $i^{th}$ SOH is equal to or less than the second reference value, the control circuit 231 may determine the $i^{th}$ rotation speed associated with the $i^{th}$ cooling fan 210_i using the following Equation 3. When the $i^{th}$ temperature value is equal to or greater than the first reference value and the $i^{th}$ SOH is equal to or less than the second reference value, the control circuit 231 may determine the $i^{th}$ rotation speed associated with the $i^{th}$ cooling fan 210_i using the following Equation 4.

$$F_i = \{(T_i - T_L) \times K_3\} + \{(SOH_{ref} - SOH_i) \times K_5\} \quad \text{[Equation 3]}$$

$$F_i = \{(T_i - T_L) \times K_3\} + \{(T_i - T_{ref}) \times K_4\} + \{(SOH_{ref} - SOH_i) \times K_5\} \quad \text{[Equation 4]}$$

In Equations 3 and 4, $T_i$ denotes the $i^{th}$ temperature value, $T_L$ denotes the threshold temperature value, $T_{ref}$ denotes the first reference value, $SOH_i$ denotes the $i^{th}$ SOH, $SOH_{ref}$ denotes the second reference value, $K_3$ denotes the third weight, $K_4$ denotes the fourth weight, $K_5$ denotes the fifth weight, and $F_i$ denotes the $i^{th}$ rotation speed associated with the $i^{th}$ cooling fan 210_i. Each of $K_3$, $K_4$ and $K_5$ may be a preset positive number. Alternatively, $K_3$ and $K_4$ may be obtained from a third data table and a fourth data table, respectively, using the first reference value of the battery temperature information as an index. The third data table defines a correspondence between $T_{ref}$ and $K_3$. In the third data table, a larger $T_{ref}$ is associated with a larger $K_3$. The fourth data table defines a correspondence between $T_{ref}$ and $K_4$. In the fourth data table, a larger $T_{ref}$ is associated with a larger $K_4$. The first data table may be used as the third data table. That is, $K_3$ may be equal to $K_1$. The second data table can be used as the fourth data table. That is, $K_4$ may be equal to $K_2$.

$K_5$ may be obtained from a fifth data table using the second reference value of the battery life information as an index. The fifth data table defines a correspondence between $SOH_{ref}$ and $K_5$. In the fifth data table, a smaller $SOH_{ref}$ is associated with a larger $K_5$.

In step S540, the master 230 outputs the first to $n^{th}$ control signals C_1 to C_n to the first to $n^{th}$ cooling fans 210_1 to 210_n. That is, the $i^{th}$ control signal C_i is output to the $i^{th}$ cooling fan 210_i. The $i^{th}$ control signal C_i is a signal for commanding the $i^{th}$ cooling fan 210_i to rotate at the $i^{th}$ rotation speed.

Figure 6:
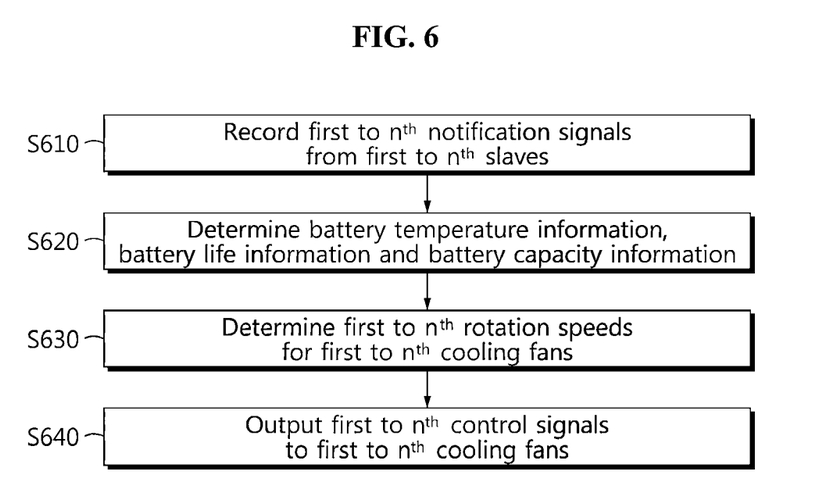
FIG. 6 is a flow chart exemplarily showing still another method for controlling the temperature of a battery group.

FIG. 6 is a flowchart exemplarily showing still another method for controlling the temperature of the battery group 20.

Referring to FIG. 6, in step S610, the master 230 records the first to $n^{th}$ notification signals R_1 to R_n from the first to $n^{th}$ slaves 220_1 to 220_n in the memory 233 of the master 230. The first to $n^{th}$ notification signals R_1 to R_n may indicate the states of the first to $n^{th}$ battery modules 30_1 to 30_n at the same time point. That is, the $i^{th}$ notification signal R_i is transmitted by the $i^{th}$ slave 220_i, and indicates the state of the $i^{th}$ battery module 30_i.

In step S620, the master 230 determines battery temperature information, battery life information and battery capacity information based on the first to $n^{th}$ notification signals R_1 to R_n. The battery temperature information includes first to $n^{th}$ temperature values and a first reference value. The battery life information includes first to $n^{th}$ SOHs and a second reference value. The battery capacity information includes first to $n^{th}$ SOCs and a third reference value.

In step S630, the master 230 determines the first to $n^{th}$ rotation speeds for the first to $n^{th}$ cooling fans 210_1 to 210_n based on the battery temperature information, the battery life information and the battery capacity information.

For example, no matter whether the battery group 20 is being charged or discharged, when the $i^{th}$ temperature value is equal to or less than the first reference value and the $i^{th}$ SOH is equal to or greater than the second reference value, the control circuit 231 may determine the $i^{th}$ rotation speed associated with the $i^{th}$ cooling fan 210_i using the above Equation 1. When the $i^{th}$ temperature value is equal to or greater than the first reference value and the $i^{th}$ SOH is equal to or greater than the second reference value, the control circuit 231 may determine the $i^{th}$ rotation speed associated with the $i^{th}$ cooling fan 210_i using the above Equation 2.

As another example, when the $i^{th}$ temperature value is equal to or less than the first reference value and the $i^{th}$ SOH is equal to or less than the second reference value, the control circuit 231 may determine the $i^{th}$ rotation speed associated with the $i^{th}$ cooling fan 210_i using the following Equation 5. During the discharging of the battery group 20, when the $i^{th}$ temperature value is equal to or greater than the first reference value and the $i^{th}$ SOH is equal to or less than the second reference value, the control circuit 231 may determine the $i^{th}$ rotation speed associated with the $i^{th}$ cooling fan 210_i using the following Equation 6.

$$F_i = \{(T_i - T_L) \times K_6\} + \{(SOH_{ref} - SOH_i) \times K_8\} + \{(SOC_i - SOC_{ref}) \times K_9\} \qquad \text{[Equation 5]}$$

$$F_i = \{(T_i - T_L) \times K_6\} + \{(T_i - T_{ref}) \times K_7\} + \{(SOH_{ref} - SOH_i) \times K_8\} + \{(SOC_i - SOC_{ref}) \times K_9\} \qquad \text{[Equation 6]}$$

Equations 5 and 6 take into account the characteristic that the SOC of the battery module 30_i being discharged drops at a lower rate since the internal resistance of the battery module 30_i increases as the battery module 30_i degrades.

As another example, when the $i^{th}$ temperature value is equal to or less than the first reference value and the $i^{th}$ SOH is equal to or less than the second reference value, the control circuit 231 may determine the $i^{th}$ rotation speed associated with the $i^{th}$ cooling fan 210_i using the following Equation 7. During the charging of the battery group 20, when the $i^{th}$ temperature value is equal to or greater than the first reference value and the $i^{th}$ SOH is equal to or less than the second reference value, the control circuit 231 may determine the $i^{th}$ rotation speed associated with the $i^{th}$ cooling fan 210_i using the following Equation 8.

$$F_i = \{(T_i - T_L) \times K_6\} + \{(SOH_{ref} - SOH_i) \times K_8\} + \{(SOC_{ref} - SOC_i) \times K_9\} \qquad \text{[Equation 7]}$$

$$F_i = \{(T_i - T_L) \times K_6\} + \{(T_i - T_{ref}) \times K_7\} + \{(SOH_{ref} - SOH_i) \times K_8\} + \{(SOC_{ref} - SOC_i) \times K_9\} \qquad \text{[Equation 8]}$$

Equations 7 and 8 take into consideration the characteristic that the SOC of the battery module 30_i being charged rises at a lower rate since the internal resistance of the battery module 30_i increases as the battery module 30_i degrades.

In Equations 5 to 8, $T_i$ denotes the $i^{th}$ temperature value, $T_L$ denotes the threshold temperature value, $T_{ref}$ denotes the first reference value, $SOH_i$ denotes the $i^{th}$ SOH, $SOH_{ref}$ denotes the second reference value, $SOC_i$ denotes the $i^{th}$ SOC, $SOC_{ref}$ denotes the third reference value, $K_6$ denotes the sixth weight, $K_7$ denotes the seventh weight, $K_8$ denotes the eighth weight, $K_9$ denotes the ninth weight, and $F_i$ denotes the rotation speed associated with the $i^{th}$ cooling fan 210_i.

When the $i^{th}$ SOH is equal to or less than the second reference value, the control circuit 231 may determine the $i^{th}$ rotation speed associated with the $i^{th}$ cooling fan 210_i using any one of Equations 5 to 8. For example, the control circuit 231 may determine the $i^{th}$ rotation speed using Equation 5 or 6 during the discharging of the battery group 20, and determine the $i^{th}$ rotation speed using Equation 7 or 8 during the charging of the battery group 20.

Each of $K_6$, $K_7$, $K_8$ and $K_9$ may be a preset positive number. Alternatively, $K_6$ and $K_7$ may be obtained from a sixth data table and a seventh data table, respectively, using the first reference value of the battery temperature information as an index. The sixth data table defines a correspondence between $T_{ref}$ and $K_6$. In the sixth data table, a larger $T_{ref}$ is associated with a larger $K_6$. The seventh data table defines a correspondence between $T_{ref}$ and $K_7$. In the seventh data table, a larger $T_{ref}$ is associated with a larger $K_7$. The first data table may be used as the sixth data table. That is, $K_6$ may be equal to $K_1$. The second data table may be used as the seventh data table. That is, $K_7$ may be equal to $K_2$.

$K_8$ may be obtained from an eighth data table using the second reference value of the battery life information as an index. The eighth data table defines a correspondence between $SOH_{ref}$ and $K_8$. In the eighth data table, a smaller SOH$_{ref}$ is associated with a larger K$_8$. The fifth data table may be used as the eighth data table. That is, K$_8$ may be equal to K$_8$.

K$_9$ may be obtained from a ninth data table using the third reference value of the battery capacity information as an index. The ninth data table defines a correspondence between SOC$_{ref}$ and K$_9$. In the ninth data table, a larger SOC$_{ref}$ is associated with a larger K$_9$.

In step S640, the master 230 outputs the first to n$^{th}$ control signals C_1 to C_n to the first to n$^{th}$ cooling fans 210_1 to 210_n. That is, the i$^{th}$ control signal C_i is output to the i$^{th}$ cooling fan 210_i. The i$^{th}$ control signal C_i is a signal for commanding the i$^{th}$ cooling fan 210_i to rotate at the i$^{th}$ rotation speed.

In the method of FIGS. 4 to 6, when F$_i$ determined from one of Equations 1 to 8 is less than a predetermined lower limit, the control circuit 231 may determine the i$^{th}$ rotation speed associated with the i$^{th}$ cooling fan 210_i to be equal to the predetermined lower limit. For example, when F$_i$=-3 (times/sec) and the predetermined lower limit=0 (rotations/sec), the i$^{th}$ rotation speed associated with the i$^{th}$ cooling fan 210_i may be limited to 0 (rotations/sec).

When F$_i$ determined from one of Equations 1 to 8 exceeds a predetermined upper limit, the control circuit 231 may determine the i$^{th}$ rotation speed associated with the i$^{th}$ cooling fan 210_i to be equal to the predetermined upper limit. For example, when F$_i$=55 (rotations/sec) and the predetermined upper limit=30 (rotations/sec), the i$^{th}$ rotation speed associated with the i$^{th}$ cooling fan 210_i may be limited to 30 (rotations/sec). The predetermined upper limit may be the maximum rotation speed of the i$^{th}$ cooling fan 210_i.

Accordingly, the i$^{th}$ rotation speed associated with the i$^{th}$ cooling fan 210_i may be determined based on the temperature, the SOH and/or the SOC of the i$^{th}$ battery module 30_i in the range between the predetermined upper limit and the predetermined lower limit.

The method of each of FIGS. 4 to 6 may be repeatedly performed periodically or aperiodically.

Figure 7:
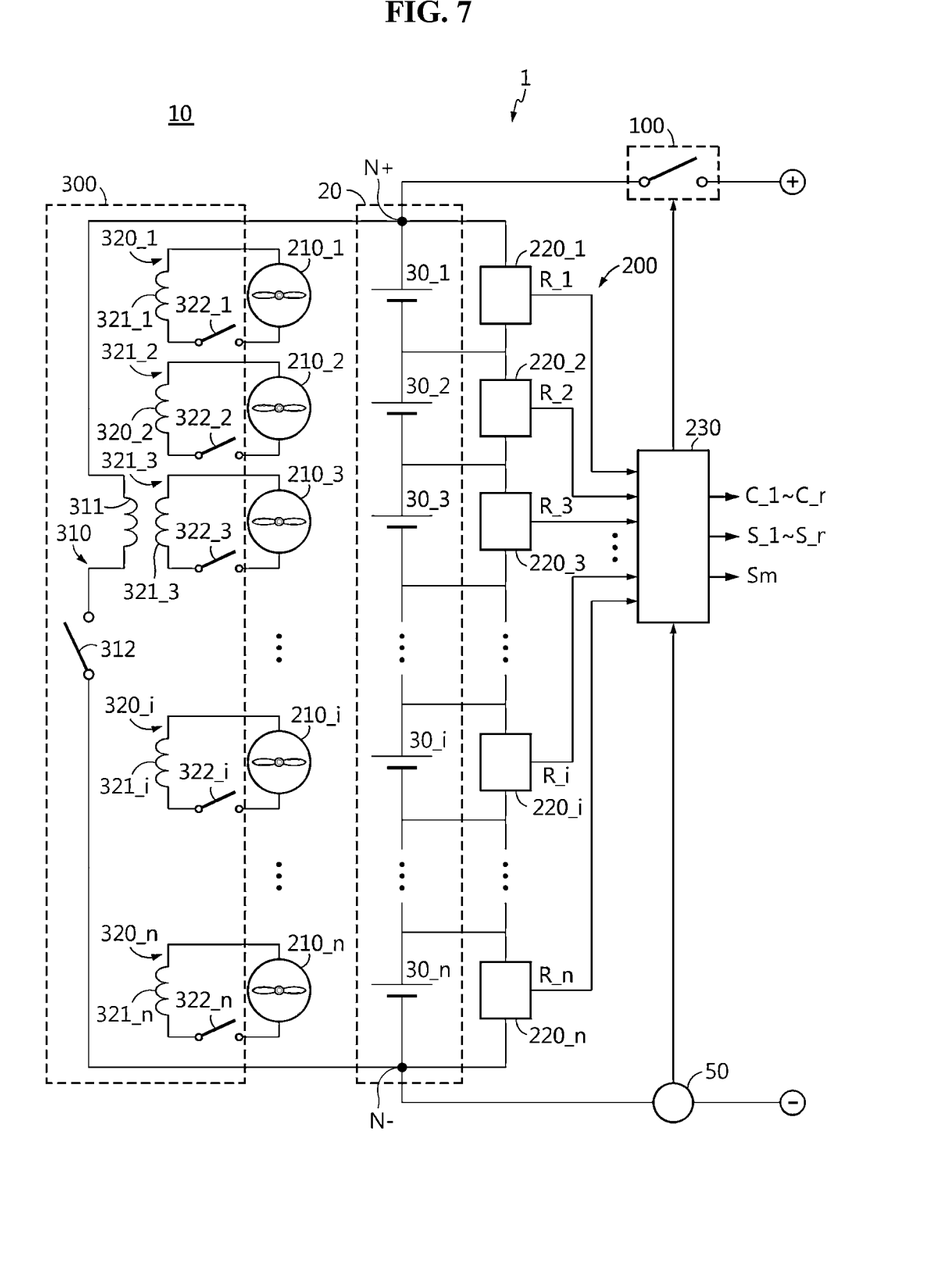
FIG. 7 is a diagram exemplarily showing a configuration of a battery system according to a second embodiment of the present disclosure.

FIG. 7 is a diagram exemplarily showing a configuration of a battery system 10 according to a second embodiment of the present disclosure. To avoid redundancy, the battery system 10 according to the second embodiment will be described with regard to differences from the first embodiment (see FIGS. 1 to 3).

The battery system 10 of the second embodiment is different from that of the first embodiment in that the apparatus 200 further includes a power supply circuit 300 for replacing n pairs of power supply lines provided as a power supply path between the first to n$^{th}$ cooling fans 210_1 to 210_n and the first to n$^{th}$ battery modules 30_1 to 30_n.

Referring to FIG. 7, the power supply circuit 300 is configured to supply power required to operate the first to n$^{th}$ cooling fans 210_1 to 210_n, and includes a main series circuit 310 and first to n$^{th}$ sub-series circuits 320_1 to 320_n.

The main series circuit 310 is electrically connected in parallel to the battery group 20 through the first node N+ and the second node N-. The main series circuit 310 includes a main coil 311 and a main switch 312 connected in series to each other. For example, the main switch 312 may include a field effect transistor. One end of the main coil 311 may be connected to the first node N+, and the other end of the main coil 311 may be connected to one end of the main switch 312. The other end of the main switch 312 may be connected to the second node N-.

The first to n$^{th}$ sub-series circuits 320_1 to 320_n are provided to the first to n$^{th}$ cooling fans 210_1 to 210_n in a one-to-one relationship. The i$^{th}$ sub-series circuit 320_i includes a sub-coil 321_i and a sub-switch 322_i connected in series to each other. The sub-switch 322_i may be a field effect transistor. One end of the sub-coil 321_i may be connected to one of two power terminals of the cooling fan 210_i, and the other end of the sub-coil 321_i may be connected to one end of the sub-switch 322_i. The other end of the sub-switch 322_i may be connected to the other of the two power terminals of the cooling fan 210_i. The power supply circuit 300 uses a flyback transformer, and the main coil 311 and the sub-coil 321_i may be magnetically coupled to each other. A ratio of the number of turns of the sub-coil 321_i to the number of turns of the main coil 311 may be preset to a value of 0 to 1 (for example, 1/n).

The methods related to the first embodiment described above with reference to FIGS. 4 to 6 may be commonly used to control the temperature of the battery group 20 of the battery system 10 according to the second embodiment. The control circuit 231 may control the main switch 312 and the first to n$^{th}$ sub-switches 322_1 to 322_n based on the first to n$^{th}$ rotation speeds determined in the step S430, the step S530 or the step S630.

Figure 8:
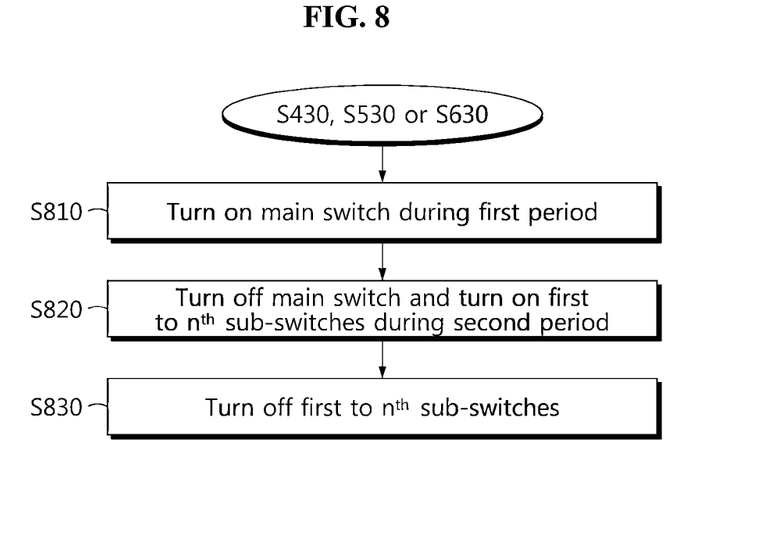
FIG. 8 is a flowchart exemplarily showing a method for controlling a power supply circuit of FIG. 7.

FIG. 8 is a flowchart exemplarily showing a method for controlling the power supply circuit 300 of FIG. 7.

Referring to FIG. 8, in step S810, the master 230 turns on the main switch 312 during a first period. The start time of the first period may be within a predetermined time (for example, 0.01 sec) from the time point when the step S440, the step S540 or the step S640 is completed. The main switch 312 is turned on in response to the switching signal SM from the control circuit 231. Accordingly, during the first period, the current flows through the main series circuit 310, and energy is transmitted from the battery group 20 to the main coil 311.

In step S820, the master 230 turns off the main switch 312 and turns on the first to n$^{th}$ sub-switches 322_1 to 322_n during a second period. The start time of the second period may follow the end time of the first period. The control circuit 231 outputs the first to n$^{th}$ switching signals S_1 to S_n to the first to n$^{th}$ sub-switches 322_1 to 322_n. The sub-switch 322_i is turned on in response to the switching signal S_i from the control circuit 231. When the main switch 312 is turned off and the sub-switch 322_i is turned on, electromagnetic energy stored in the main coil 311 during the first period is wirelessly emitted. Accordingly, during the second period, power is supplied to the first to n$^{th}$ cooling fans 210_1 to 210_n through the first to n$^{th}$ sub-series circuits 320_1 to 320_n. Step S820 may be performed in parallel with the step S440, the step S540 or the step S640. That is, while the first to n$^{th}$ sub-series circuits 320_1 to 320_n supply power to the first to n$^{th}$ cooling fans 210_1 to 210_n, the first to n$^{th}$ cooling fans 210_1 to 210_n operate at the first to n$^{th}$ rotation speeds in response to the first to n$^{th}$ control signals C_1 to C_n from the master 230. The time length of each of the first period of step S810 and the second period of step S820 may be preset.

In step S830, the master 230 turns off the first to n$^{th}$ sub-switches 322_1 to 322_n.

As opposed to the first embodiment in which power required to operate the i$^{th}$ cooling fan 210_i is only supplied from the i$^{th}$ battery module 30_i, according to the second embodiment described above with reference to FIGS. 7 and 8, power required to operate the i$^{th}$ cooling fan 210_i is supplied from all of the first to n$^{th}$ battery modules 30_1 to 30_n. As opposed to the first and second embodiments, power required to operate the first to n$^{th}$ cooling fans 210_1 to 210_n may be supplied from an external power source.

The embodiments of the present disclosure described hereinabove are not implemented only through the apparatus and method, and may be implemented through programs that perform the functions corresponding to the configurations of the embodiments of the present disclosure or recording media having the programs recorded thereon, and such implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

What is claimed is:

1. A battery temperature control apparatus for a battery group, including first to $n^{th}$ battery modules connected in series, n being a natural number of 2 or greater, the battery temperature control apparatus comprising:
    first to $n^{th}$ cooling fans provided to the first to $n^{th}$ battery modules in a one-to-one relationship;
    first to $n^{th}$ slave management units provided to the first to $n^{th}$ battery modules in a one-to-one relationship; and
    a master management unit operably coupled to the first to $n^{th}$ cooling fans and the first to $n^{th}$ slave management units, the master management unit being configured to:
        determine battery temperature information including first to $n^{th}$ temperature values and a first reference value based on a notification signal from each of the first to $n^{th}$ slave management units, the first to $n^{th}$ temperature values indicating temperatures of the first to $n^{th}$ battery modules, the first reference value being an average or a median of the first to $n^{th}$ temperature values;
        determine battery life information including first to $n^{th}$ states of health (SOHs) and a second reference value based on the notification signal, wherein the first to $n^{th}$ SOHs indicate a remaining life of the first to $n^{th}$ battery modules, and the second reference value is an average or a median of the first to $n^{th}$ SOHs;
        if the $i^{th}$ temperature value is equal to or less than the first reference value, determine a rotation speed of the $i^{th}$ cooling fan based on a difference between the $i^{th}$ temperature value and a threshold temperature value, wherein the threshold temperature value indicates a predetermined lower limit temperature, and i is an integer from 1 to n;
        if the $i^{th}$ temperature value is greater than the first reference value, determine the rotation speed of the $i^{th}$ cooling fan based on the difference between the $i^{th}$ temperature value and the threshold temperature value, and based on a difference between the $i^{th}$ temperature value and the first reference value; and
        if the $i^{th}$ SOH is less than the second reference value, determine the rotation speed of the $i^{th}$ cooling fan based on the difference between the $i^{th}$ temperature value and the threshold temperature value, based on a difference between the $i^{th}$ temperature value and the first reference value, and based on a difference between the second reference value and the $i^{th}$ SOH.

2. The battery temperature control apparatus according to claim 1, wherein the master management unit is configured to:
    if the $i^{th}$ temperature value is equal to or less than the first reference value, and the $i^{th}$ SOH is less than the second reference value, determine the rotation speed of the $i^{th}$ cooling fan using a following Equation 3; and
    if the $i^{th}$ temperature value is greater than the first reference value, and the $i^{th}$ SOH is less than the second reference value, determine the rotation speed of the $i^{th}$ cooling fan using a following Equation 4:

$$F_i = \{(T_i - T_L) \times K_3\} + \{(SOH_{ref} - SOH_i) \times K_5\} \quad \text{[Equation 3]}$$

$$F_i = \{(T_i - T_L) \times K_3\} + \{(T_i - T_{ref}) \times K_4\} + \{(SOH_{ref} - SOH_i) \times K_5\} \quad \text{[Equation 4]}$$

where, in the Equations 3 and 4:
    $T_i$ is the $i^{th}$ temperature value,
    $T_L$ is a threshold temperature value,
    $T_{ref}$ is the first reference value,
    $SOH_i$ is the $i^{th}$ SOH,
    $SOH_{ref}$ is the second reference value,
    $K_3$ is a third weight,
    $K_4$ is a fourth weight,
    $K_5$ is a fifth weight, and
    $F_i$ is the rotation speed of the $i^{th}$ cooling fan.

3. The battery temperature control apparatus according to claim 1, wherein the master management unit is further configured to:
    determine battery capacity information including first to $n^{th}$ states of charge (SOCs) and a third reference value based on the notification signal, the first to $n^{th}$ SOCs indicating a remaining capacity of the first to $n^{th}$ battery modules, the third reference value being an average or a median of the first to $n^{th}$ SOCs; and
    determine the rotation speed of the $i^{th}$ cooling fan further based on the $i^{th}$ SOC.

4. The battery temperature control apparatus according to claim 3, wherein the master management unit is further configured to:
    if the $i^{th}$ temperature value is equal to or less than the first reference value, and the $i^{th}$ SOH is less than the second reference value, determine the rotation speed of the $i^{th}$ cooling fan using a following Equation 5; and
    if the $i^{th}$ temperature value is greater than the first reference value, and the $i^{th}$ SOH is less than the second reference value, determine the rotation speed of the $i^{th}$ cooling fan using a following Equation 6:

$$F_i = \{(T_i - T_L) \times K_6\} + \{(SOH_{ref} - SOH_i) \times K_8\} + \{(SOC_i - SOC_{ref}) \times K_9\} \quad \text{[Equation 5]}$$

$$F_i = \{(T_i - T_L) \times K_6\} + \{(T_i - T_{ref}) \times K_7\} + \{(SOH_{ref} - SOH_i) \times K_8\} + \{(SOC_i - SOC_{ref}) \times K_9\} \quad \text{[Equation 6]}$$

where, in the Equations 5 and 6:
    $T_i$ is the $i^{th}$ temperature value,
    $T_{ref}$ is the first reference value,
    $T_L$ is a threshold temperature value,
    $SOH_i$ is the $i^{th}$ SOH,
    $SOH_{ref}$ is the second reference value, $SOC_i$ is the $i^{th}$ SOC,
$SOC_{ref}$ is the third reference value,
$K_6$ is a sixth weight,
$K_7$ is a seventh weight,
$K_8$ is an eighth weight,
$K_9$ is a ninth weight, and
$F_i$ is the rotation speed of the $i^{th}$ cooling fan.

5. The battery temperature control apparatus according to claim 1, further comprising:
   a power supply including:
      a main series circuit connected in parallel to the battery group; and
      first to $n^{th}$ sub-series circuits connected in parallel to the first to $n^{th}$ cooling fans in a one-to-one relationship,
   wherein the main series circuit includes a main coil and a main switch connected in series to each other,
   wherein each sub-series circuit includes a sub-coil and a sub-switch connected in series to each other, and
   wherein the master management unit is further configured to control the main switch and each sub-switch based on the rotation speed of each of the first to $n^{th}$ cooling fans.

6. A battery system comprising the battery temperature control apparatus according to claim 1.

7. An energy storage system, comprising the battery system according to claim 6.

8. A battery temperature control method for a battery group, including first to $n^{th}$ battery modules connected in series, n being a natural number of 2 or greater, the battery temperature control method comprising:
   determining battery temperature information including first to $n^{th}$ temperature values and a first reference value, the first to $n^{th}$ temperature values indicating temperatures of the first to $n^{th}$ battery modules, the first reference value being an average or a median of the first to $n^{th}$ temperature values;
   determining battery life information including first to $n^{th}$ states of health (SOHs) and a second reference value, wherein the first to $n^{th}$ SOHs indicate a remaining life of the first to $n^{th}$ battery modules, and the second reference value is an average or a median of the first to $n^{th}$ SOHs;
   if the $i^{th}$ temperature value is equal to or less than the first reference value, determining a rotation speed of the $i^{th}$ cooling fan based on a difference between the $i^{th}$ temperature value and a threshold temperature value, wherein the threshold temperature value indicates a predetermined lower limit temperature, and i is an integer from 1 to n;
   if the $i^{th}$ temperature value is greater than the first reference value, determining the rotation speed of the $i^{th}$ cooling fan based on the difference between the $i^{th}$ temperature value and the threshold temperature value, and based on a difference between the $i^{th}$ temperature value and the first reference value; and
   if the $i^{th}$ SOH is less than the second reference value, determining the rotation speed of the $i^{th}$ cooling fan based on the difference between the $i^{th}$ temperature value and the threshold temperature value, based on a difference between the $i^{th}$ temperature value and the first reference value, and based on a difference between the second reference value and the $i^{th}$ SOH.

9. The battery temperature control method according to claim 8, further comprising:
   determining battery capacity information including first to $n^{th}$ states of charge (SOCs) and a third reference value,
   wherein the first to $n^{th}$ SOCs indicate a remaining capacity of the first to $n^{th}$ battery modules,
   wherein the third reference value is an average or a median of the first to $n^{th}$ SOCs, and
   wherein the rotation speed of the $i^{th}$ cooling fan is determined further based on the $i^{th}$ SOC.

* * * * *